United States Patent [19]

Naaktgeboren

[11] 4,306,650
[45] Dec. 22, 1981

[54] AGRICULTURAL BALE PICK-UP MEANS

[75] Inventor: Adrianus Naaktgeboren, Zedelgem, Belgium

[73] Assignee: Sperry Corporation, New Holland, Pa.

[21] Appl. No.: 165,162

[22] Filed: Jul. 1, 1980

[30] Foreign Application Priority Data

Jul. 4, 1979 [GB] United Kingdom ............... 23325/79

[51] Int. Cl.³ .............................................. A01D 87/12
[52] U.S. Cl. .................................... 198/510; 198/836; 414/111; 414/518
[58] Field of Search ..................... 414/39, 40, 44, 111, 414/518; 198/308, 510, 522, 836

[56] References Cited

U.S. PATENT DOCUMENTS

| | | | |
|---|---|---|---|
| 3,367,522 | 2/1968 | Grey et al. | 414/518 |
| 3,572,527 | 3/1971 | Butler | 414/518 |
| 3,622,022 | 11/1971 | Grey | 414/528 |

FOREIGN PATENT DOCUMENTS 2027668 2/1980 United Kingdom ................ 414/39

*Primary Examiner*—Leslie J. Paperner
*Attorney, Agent, or Firm*—Frank A. Seemar; James R. Bell

[57] ABSTRACT

Bale pick-up means comprising a frame, bale elevator means mounted on the frame and operable to lift a bale from the ground, and bale holding means operable constantly to engage a bale being elevated and to hold the bale in contact with the elevator means. The bale holding means comprises a planar bale shoe or plate suspended from the frame by first link means, second link means and third link means, the first and second link means being capable of operating as a parallelogram linkage and the line of action of the third link means, when operable, crossing the line of action of the first link means.

7 Claims, 9 Drawing Figures

AGRICULTURAL BALE PICK-UP MEANS

BACKGROUND OF THE INVENTION

This invention relates generally to agricultural bale pick-up means which are employed in bale wagons, and more particularly, but not exclusively, to automatic bale wagons, which pick up bales from the ground, load the bales onto one or more load beds or floors in a predetermined manner, and unload the bales, also in a predetermined manner, without any manual assistance save for the operator's driving the wagon (be it of the self-propelled or towed type) and operating the controls.

In contrast to the automatic bale wagon, there exists the random bale wagon which has the advantage of simplicity, since all that is required is a load space and a mechanism to pick up bales from the ground and convey or throw them into the load space.

There is, of course, a need for bale pick-up means, whether employed in an automatic bale wagon, a random bale wagon or other agricultural equipment, to operate efficiently in picking up bales from the ground. A significant factor in this operation is the contact between the pick-up means and a bale being picked up. In typical bale pick-up means there is provided an elevator, often of the endless chain type, operable to engage a bale end and to elevate that bale to a position in which the longitudinal axis of the bale is generally vertical. The bale is then delivered either to another component of the pick-up means or to the bale wagon, for example, with which it may be employed. Since contact with the bale is normally as a result of the pick-up means being maneuvered towards the bale which is stationary in a field, initial contact is often adequate but once the bale has been lifted clear of the ground, or the area of contact between the bale and the ground reduced by a significant amount, it is very desirable to positively urge a bale into contact with the elevator.

In the bale pick-up means or loader of U.S. Pat. No. 3,572,527, this is achieved by the use of a bale shoe or holder which is a planar member pivotally suspended from a frame of the pick-up means for movement about a single axis extending transversely of the associated elevator. Such a shoe functions reasonably well but has been found lacking for two main reasons: firstly the distance between the single pivot axis and the elevator is fixed, and secondly, there is a tendency for the shoe to pivot when there is a bump or indentation in a bale's surface with the result that the area of contact between the shoe and bale is much reduced. As regards the fixed distance between the shoe pivot axis and the elevator, problems can arise due to the fairly frequent variations in bale size. Oversize bales tend to jam between the shoe and elevator and undersize bales lose contact with at least a major portion of the shoe, thereby reducing its effectiveness and causing some hesitancy in the pick up of a bale. The foregoing problems are solved in the design of the apparatus comprising the present invention by providing bale pick-up means comprising a frame, bale elevator means mounted on the frame operable to lift a bale from the ground and bale holding means effective to constantly engage a bale being elevated and to hold the bale in contact with the elevator means.

SUMMARY OF THE INVENTION

It is an object of the present invention to provide bale pick-up means having a bale shoe or bale holding means which provides good contact between bale and elevator in at least the majority of circumstances.

It is an advantage of the present invention that there is provided in a bale pick-up means bale elevator means operable to lift a bale from the ground and via bale holding means to constantly engage a bale being elevated during the lifting process and to hold the bale in contact with the elevator means.

BRIEF DESCRIPTION OF THE DRAWINGS

The objects and advantages will become apparent upon consideration of the following detailed disclosure of the invention, especially when it is taken in conjunction with the accompanying drawings, wherein.

DETAILED DESCRIPTION OF THE PREFERRED EMBODIMENT

Figure 1:
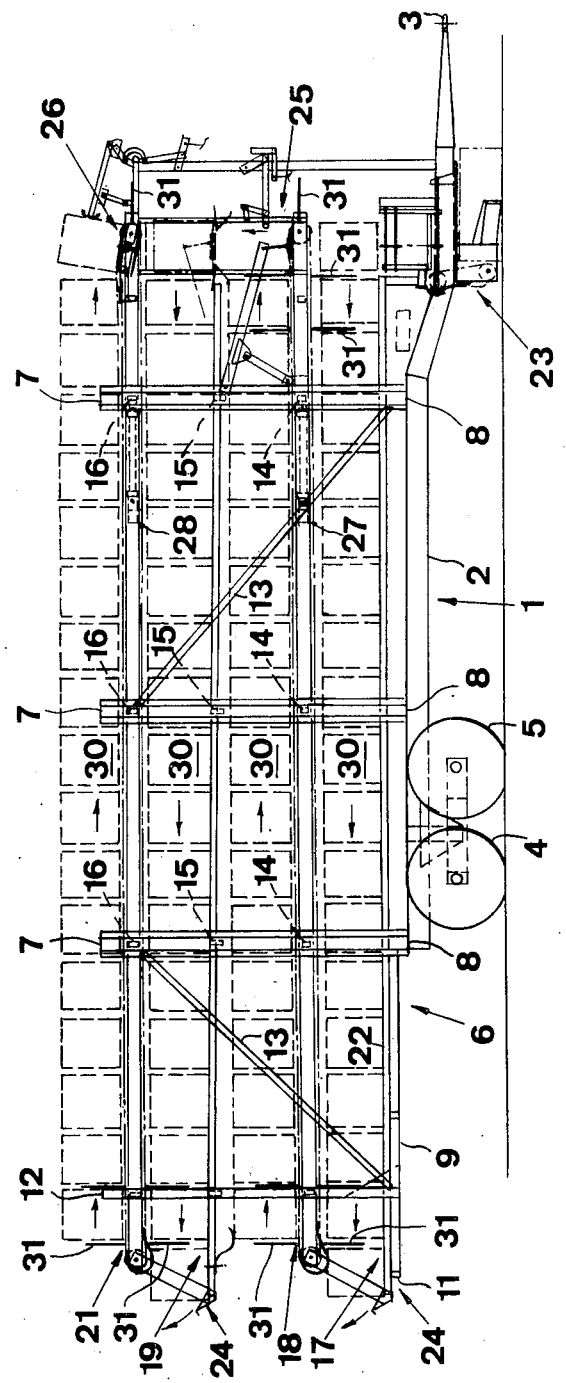
FIG. 1 is a diagrammatic side elevation of the bale wagon with certain components removed for clarity.

With reference to the drawings, particularly FIG. 1, the bale wagon is of the pull type and comprises a chassis 1 formed from two longitudinally-extending members 2 which converge at the front of the wagon to form a conventional hitch 3. Attached beneath the chassis 1 is a wheel assembly comprising two pairs of ground-engaging wheels 4 and 5. Carried on top of, and attached to, the chassis 1 is a main frame 6 for the wagon comprising three pairs of main upright beams 7 interconnected by three transverse beams 8. The frame is extended rearwardly by two longitudinally-extending side members 9 attached at one end to the rearwardmost transverse beam 8 and interconnected at the other end by a further transverse beam 11. A further pair of upright beams 12 is provided, together with stabilizing cross struts 13 interconnecting the beams 12 with the associated rearwardmost beams 7, additional cross struts 13 being provided between the front two pairs of upright beams 7.

Each pair of upright beams 7 and 12 is interconnected at spaced intervals above the chassis by three transoms 14, 15, 16, each set of transoms forming the basis of a load floor with another load floor being formed by the transverse beams 8. Thus, first, second, third and fourth load floors 17, 18, 19 and 21, respectively, are provided in the bale wagon, each floor having a base comprising a plurality of slats 22 spaced apart transversely of the wagon. The slats are made from sheet metal and have an inverted U shape with side flanges by which they are bolted or otherwise secured to the transverse beams 8 and 11 or transoms 14, 15 and 16, as appropriate.

The bale wagon further generally comprises bale pick-up means 23 mounted on the chassis 1 at the front, and to one side of the wagon, bale support means 24 provided at the rear ends of the second and fourth load floors 18 and 21, bale elevator means 25 provided at the front end of the second load floor 18 and operable between the second and third load floors 18 and 19, and bale unloading means 26 disposed at the front end of the fourth load floor 21. The general operation of the bale wagon is such that bales 30 are picked up from the ground by the pick-up means 23 and moved step by step in end-to-end pairs first rearwardly of the wagon along the length of the first load floor 17, then transferred from the first load floor to the second load floor 18 with the aid of the associated bale support means 24 and conveyed the length thereof forwardly of the bale wagon to the elevator means 25, raised by the latter to the third load floor 19, conveyed rearwardly of the wagon along the length of the third load floor 19, transferred to the fourth load floor 21 with the aid of the associated bale support means 24, and finally conveyed forwardly of the wagon along the length of the fourth load floor 21 to the unloading means 26. It will be seen that the bales move in alternate directions in traversing the four load floors 17, 18, 19 and 21.

Figure 2:
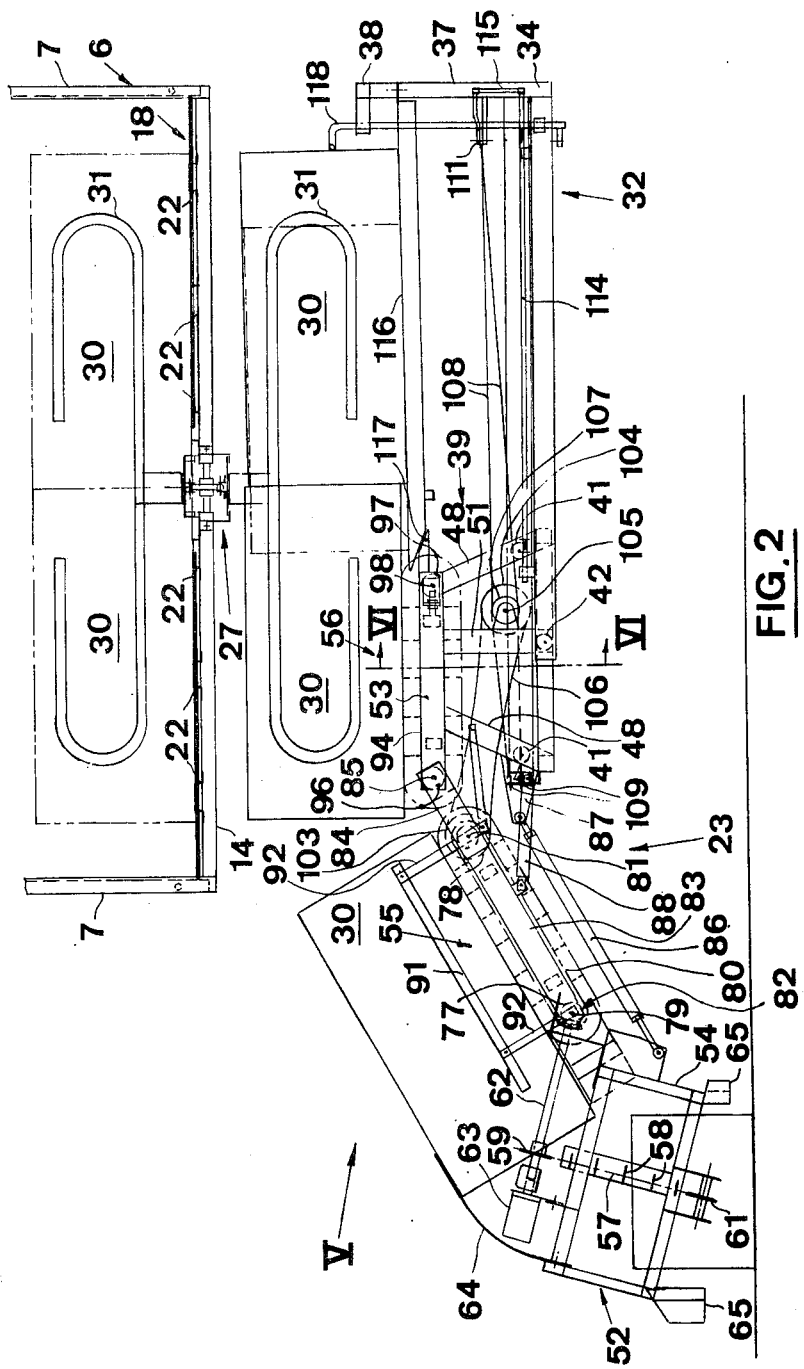
FIG. 2 is a partial front view showing the lower portion of the bale wagon with components in an operative position.
Figure 3:
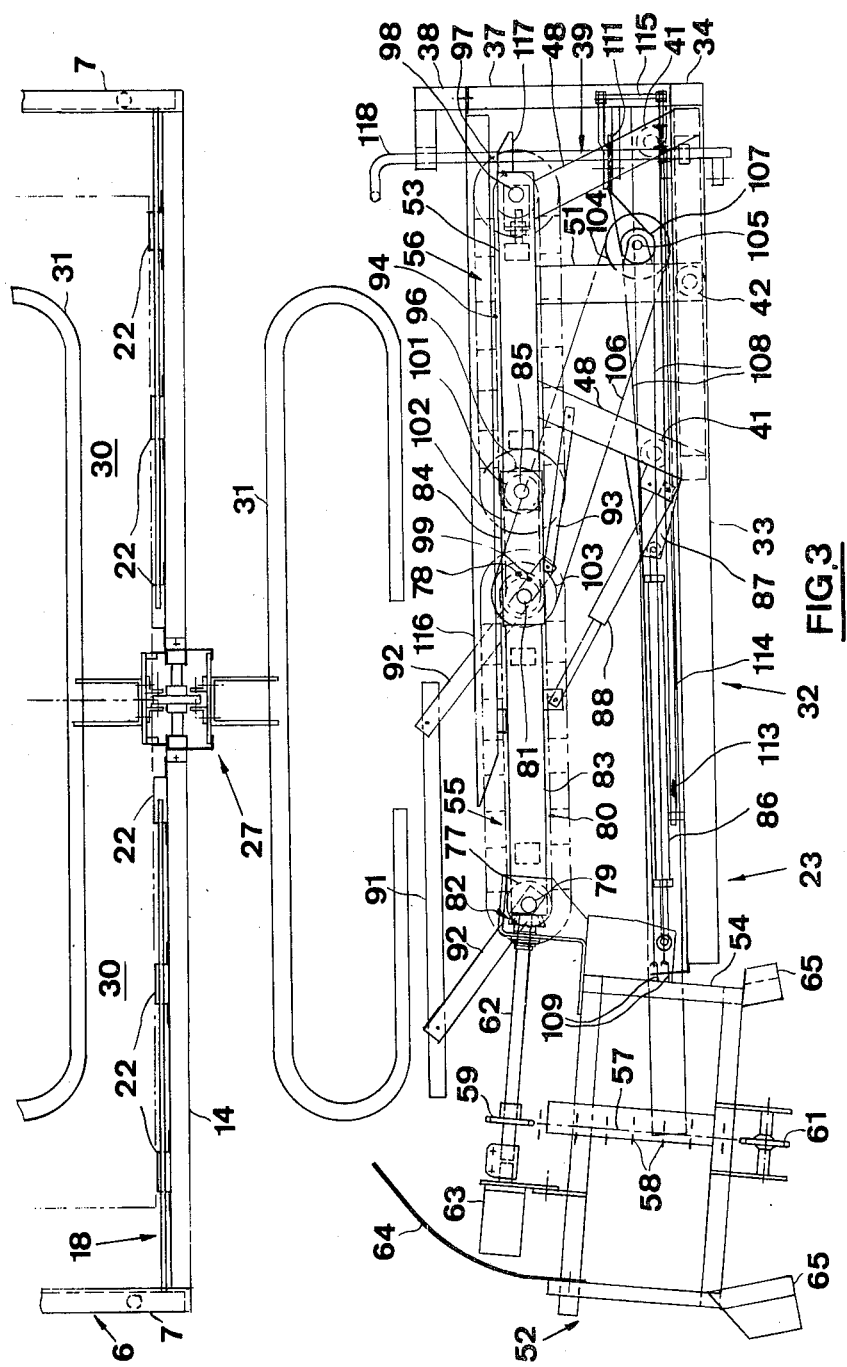
FIG. 3 is a view similar to FIG. 2 but showing certain components in an inoperative or transport position, and to a larger scale.

The bales are moved in the bale wagon by intermittently driven conveyor means in the form of chain conveyors 27 and 28 respectively provided on the second and fourth load floors 18 and 21 only and disposed centrally thereof. The chain of each conveyor 27 and 28 supports at equispaced intervals bale pushers 31 which are seen in FIGS. 2 and 3, the size of the intervals depending on the size of bale being handled. Each bale pusher 31 engages two bales 30 positioned end-to-end across the wagon, the pusher engaging each of the two bales over approximately two thirds of its length as seen in FIGS. 2 and 3.

As already mentioned, the pick-up means 23 is mounted at the front, and to one side, of the bale wagon and it is movable between an operative (FIG. 2) and an inoperative (FIG. 3) position transversely of the bale wagon, whereby at least part of the pick-up means is contained, in the inoperative position, within the width of the wagon so as to reduce the overall width of the latter for transport purposes.

The pick-up means 23 comprises a subframe 32 mounted on the chassis 1 across the two members 2 thereof at the location where they converge at the front of the wagon. The subframe 32 comprises two parallel side members 33 extending transversely of the wagon and interconnected at one end by an end member 34, the members 33 and 34 being formed from square section tubing and the two side members being displaced vertically relative to each other. Slide and guide channels 35 and 36 are provided on the respective inwardly facing sides of the two side members 33 and uprights 37 extend from respective ends of the end member 34, being interconnected by a further end member 38. The subframe 32 supports a carriage 39 for sliding movement in the slide channels 35 and 36 by way of two rear rollers 41 associated with the channel 35 and a front roller 42 associated with the channel 36. The rollers 41 and 42 are carried at the ends of respective support members 43 and 44 extending from the frame of the carriage comprising lower front and rear members 45 and 46 interconnected by two forwardly converging members 47. The carriage frame further comprises two rear, upwardly extending and converging members 48 connected between the lower rear member 46 and an upper rear member 49, and one front upwardly extending member 51 connected between the lower front member 45 and an upper front member 53. The upper front and rear members 53 and 49 extend transversely of the wagon parallel to each other.

Figure 5:
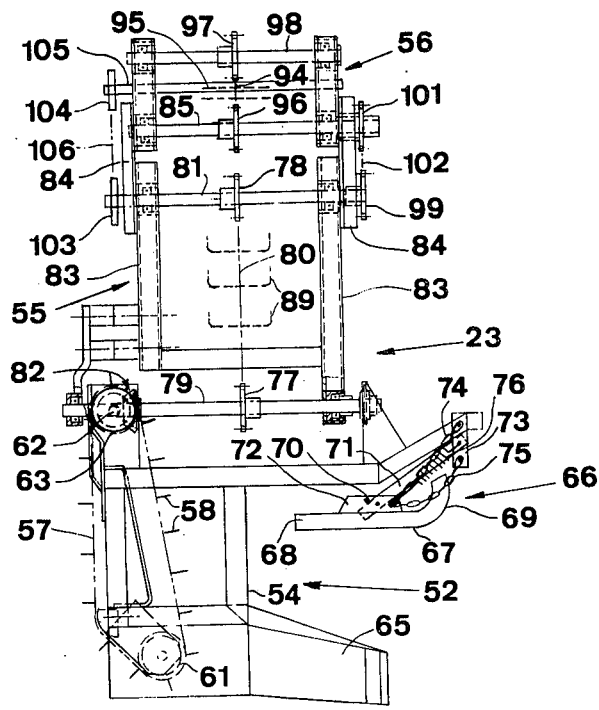
FIG. 5 is a view in the direction of arrow V of FIG. 2.

As regards bale pick-up components, the pick-up means 23 comprise an endless elevator 52 mounted in a subframe 54, an inclined, endless chain conveyor 55, and an endless chain, generally horizontal conveyor 56 mounted on the carriage 39, the inclined conveyor being disposed between the elevator and the horizontal conveyor. The elevator 52 comprises an endless chain 57 having bale conveyor members 58 attached thereto at equispaced intervals, the chain extending around a driven sprocket 59 and an idler sprocket 61. The driven sprocket 59 is attached to a shaft 62 driven by a hydraulic motor 63. It will be seen from FIGS. 2 and 5 that the line of action of the elevator 52, as defined by the forward and operative run of the chain 57, is inclined rearwardly of the wagon by an angle of 10 degrees and upwardly inclined towards the inclined conveyor 55 by an angle of 15 degrees, the former inclination helping to maintain a bale being elevated in contact with the elevator, and the latter inclination imparting a partial turn to a bale being elevated in readiness for transfer to the inclined conveyor 55. A resilient bale guide and deflector 64 is mounted on the frame 54, together with guide members 65 disposed on either side of the frame and operable to guide bales approached by the pick-up means 23 towards the elevator 52 as the bale wagon is driven over a field in which the bales are dispersed.

In order for the elevator 52 to operate efficiently, it is necessary to provide bale holding means 66 (seen in FIGS. 5 and 7-9 but not shown in FIGS. 2 and 3) constantly to urge a bale into contact with the elevator throughout the elevating process. The bale holding means 66 are mounted on the frame 54 and comprise a planar shoe in the form of a relatively heavy metal plate 67 contactable with the top face of a bale entering the pick-up means 23 and having side flanges 68 and a curved heel portion 69. The plate 67 is pivotally suspended from the frame 54 by three links: firstly by a rigid link 71 pivotally attached at one end to a bracket 72 on the plate and at the other end to a bracket 73 on the frame 54; secondly a link in the form of a chain 75 having a length equal to that of the rigid link 71 and pivotally attached at one end to the bracket 73 below the point of attachment of the rigid link thereto and pivotally attached at the other end to the bracket 72; thirdly a link also in the form of a chain 74 pivotally attached at respective ends to the brackets 72 and 73, the point of attachment to the bracket 73 being above that of the rigid link 71 and the point of attachment to the bracket 72 being coincident with that of the other chain link 75. The chain links 74 and 75 are operative or inoperative according to the orientation of the plate 67 relative to the frame 54 but when operative, the link 75 forms a parallelogram with the rigid link 71, and the line of action of the link 74 crosses that of the rigid link. A spring 76 also interconnects the brackets 72 and 73.

Figure 7:
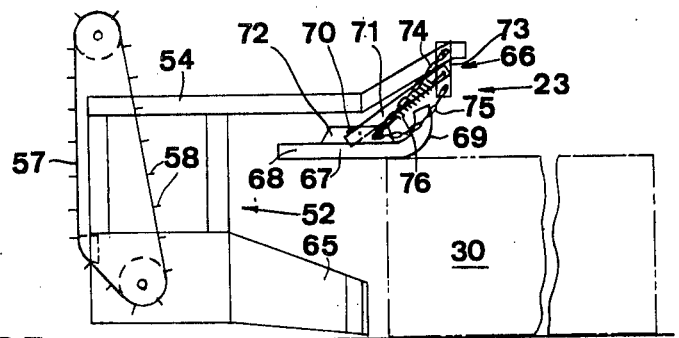
Figure 8:
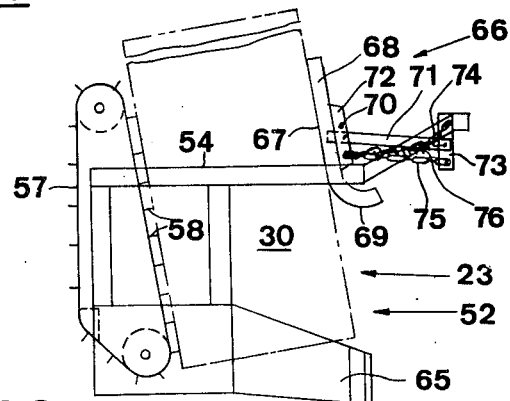
Figure 9:
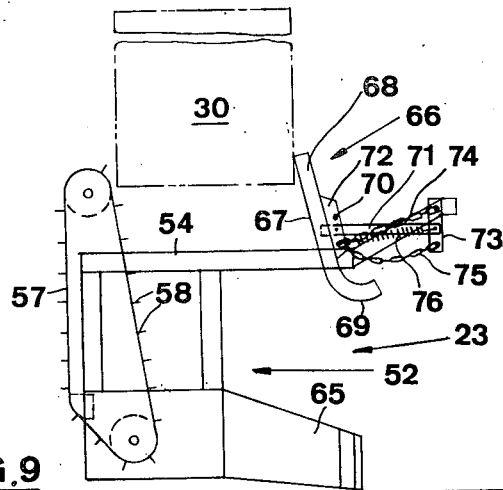

In the rest position of the bale holding means as seen in FIG. 7, the plate 67 is generally horizontal, that is generally perpendicular to the plane of action of the operative run of the elevator chain 57, ignoring the rearward inclination thereof. The height from the ground of the plate 67 in the rest position is substantially equal to height of a bale 30. The third link 74 is taut in the rest position of the bale holding means so that, in conjunction with the rigid link 71 and a stop 70 on said bale holding means and engaging said rigid link, it holds the plate 67 in the required position. The elevator 52 engages the end of a bale fed thereto by movement of the bale wagon relative to the bale, lifts that end and then engages the face of the bale previously contacting ground so that the bale is then in the position shown in FIG. 8.

The plate 67 pivots about its pivotal connection with the rigid link 71 as the end of the bale is lifted and is raised at the same time due to the provision of the third link 74 crossing the first link 73 this movement being accommodated by the pivotal connection between the rigid link and the bracket 73 on the frame 54. This reorientation of the plate 67 results in the chain link 75 becoming taut, and hence effective, to form the parallelogram with the rigid link 71 and whereafter the chain link 74 becomes slack and hence ineffective. It will be seen from FIG. 8 that the plate 67 is parallel to the operative run of the elevator chain 57 and the parallelogram formed by the links 71 and 75 will maintain this orientation irrespective of any variation in the thickness of the bale so that the bale is positively urged into contact with the elevator 52 by the weight of the plate 67 and the associated components and by the spring 76.

As the bale is further elevated by the elevator 52, it falls towards the inclined conveyor 55 and is eventually totally transferred to the same. As this transition takes place, the area of contact between the plate 67 and the bale gradually reduces with the result that the plate drops downwardly about the pivotal connection between the rigid link 71 and the bracket 73 and the chain link 74 again becomes taut and causes the plate 67 to tilt anticlockwise about the pivotal connection between the rigid link and the bracket 72 whereupon the chain link 75 again becomes slack. The chain link 74 causes the plate 67 to continue the anticlockwise tilting to ensure contact of the latter with the bale until the last possible moment. The illustrated bale holding means 66 are very effective in holding a bale against the elevator 52 throughout the action of the latter thereon which thus improves the action of the elevator in making it more positive so that there is little or no hesitancy in the picking up of bales.

The inclined conveyor 55 comprises a chain 80 extending around spaced sprockets 77 and 78 mounted on respective shafts 79 and 81, the former shaft being supported on the subframe 54 and driven by the hydraulic motor 63 through a bevel gear arrangement 82 between the shafts 79 and 62. The shaft 81 is supported between two side members 83 of the inclined conveyor 55, the side members being rigidly connected to one end of links 84 the other ends of which are pivotally attached to the carriage frame about a shaft 85 associated with the horizontal conveyor 56. The subframe 54 is pivotally attached to the inclined conveyor 55 about the shaft 79 and pivotally attached to one end of a strut 86 the other end of which is pivotally connected to a bracket 87 extending from the carriage frame. Thus the elevator 52 is suspended from the carriage frame by a parallelogram arrangement comprising the strut 86 on the one hand and the combined side members 83 and links 84 on the other hand, whereby the orientation of the elevator remains the same relative to the ground irrespective of the position of the inclined conveyor 55 relative to the horizontal conveyor 56, which position changes according to whether the pick-up means 23 is in the operative or inoperative position, as will be explained. Pivotal movement of the inclined conveyor 55 relative to the horizontal conveyor 56 is effected by a hydraulic cylinder 88 connected between the inclined conveyor and the carriage frame. The chain 80 carries relatively aggressive bale engaging and conveying members 89 at spaced intervals therealong.

The front and rear of the inclined conveyor 55 are each fitted with a bale guide and retainer rail 91, pivotally attached at spaced points to two arms 92 in turn pivotally mounted on the respective shafts 79 and 81, the four pivot points defining the corners of a parallelogram. The right hand arm 92 as seen in FIG. 3 is extended downwardly and is pivotally attached to one end of a link 93 the other end of which is pivotally attached to the carriage frame. Thus as the inclined conveyor 55 is pivoted upwardly relative to the horizontal conveyor 56, the link 93 pulls on the extension of the right hand arm 92 partially to collapse or fold the rail 91 so that it will not foul other components when the pick-up means 23 is moved to the transport position of FIG. 3.

Figure 4:
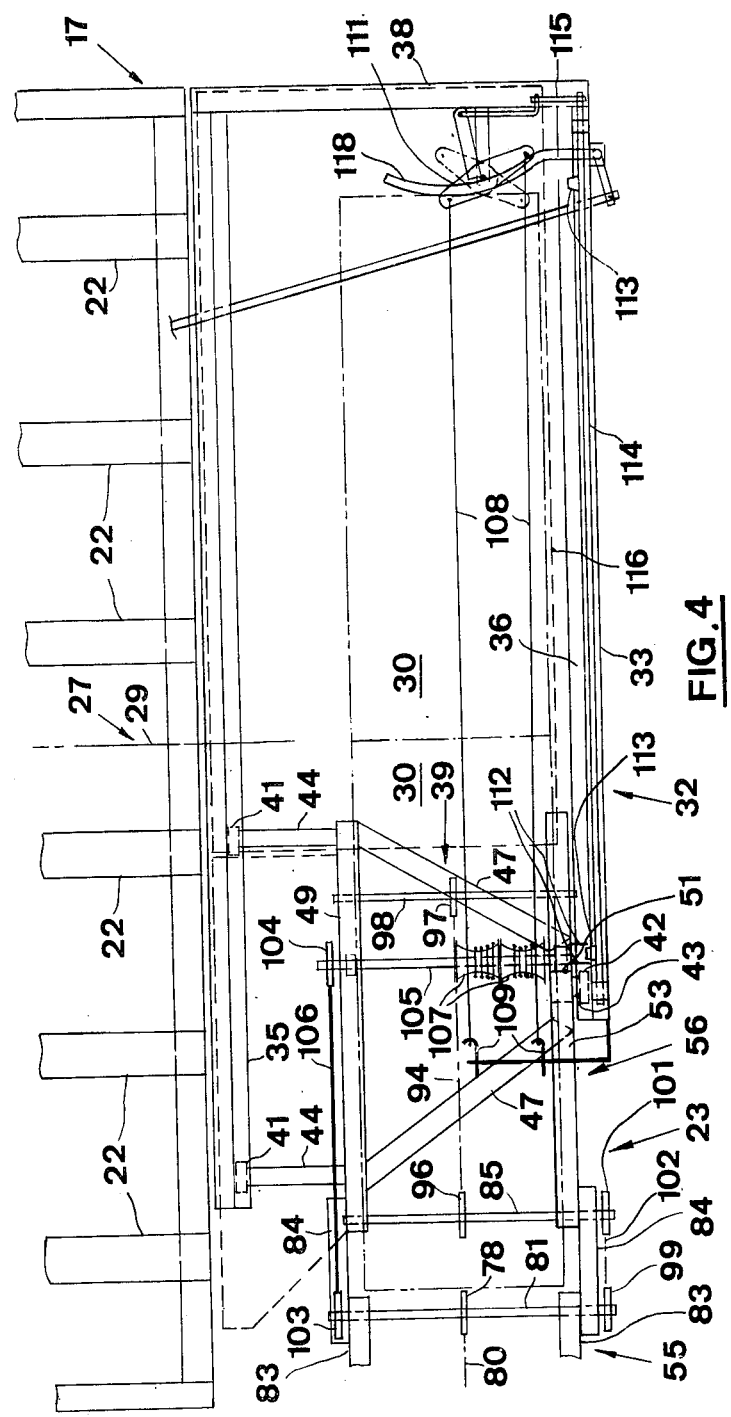
FIG. 4 is a partial plan view of FIG. 2.

Turning now to the horizontal conveyor 56, this comprises a chain 94 carrying bale engaging and conveying members 95 which are less aggressive than those of the inclined conveyor 55 and are in the form of L-shaped members extending transversely of the chain such that adequate bale conveyance is effected thereby without any interference in the subsequent transfer of the bales to the first load floor 17. The chain extends around sprockets 96 and 97, the sprocket 96 being attached to the shaft 85 and the sprocket 97 to a shaft 98 supported on the carriage frame between the members 49 and 53 thereof. The horizontal conveyor 56 is driven by the hydraulic motor 63 from the inclined conveyor shaft 81 which carries a sprocket 99 (FIGS. 3, 4 and 5) drivingly connected to a sprocket 101 on the shaft 85 by a chain 102. The hydraulic motor 63 is controlled by the valve (not shown) which also controls hydraulic motors associated with the bale unloading means 26, the valve being such that if the motor 63 is energized, the bale unloading motors are de-energized and vice versa. Furthermore, the motor 63 is de-energized when the conveyors 27 and 28 are driven so that the drive to the elevator 52, inclined conveyor 55 and horizontal conveyor 56 is interrupted when bales are being transferred from the transfer table to the first load floor 17 or otherwise moved through the bale wagon.

Figure 6:
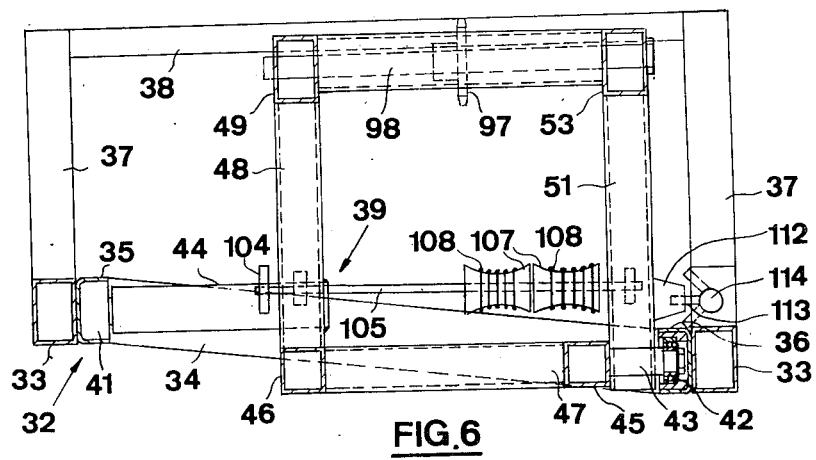
FIG. 6 is a section on the line VI—VI of FIG. 2, and FIGS. 7 to 9 are diagrammatic views of the lower portion of FIG. 5 showing certain components in different operative positions.

The shaft 81 also carries a pulley 103 and a further pulley 104 is provided on a shaft 105 supported in brackets extending from the respective members 45 and 51 of the carriage frame and disposed to one side and below the shaft 81. A belt 106 extends around the pulleys 103 and 104. Two capstans 107 (FIGS. 4 and 6) are mounted on the shaft 105 each having a rope or cable 108 therearound to form two capstan clutches, the rope of one capstan being wound oppositely to that of the other capstan. One end of each rope 108 is attached to the subframe 32 at 109 and the other end attached to a pivotal control member 111 (FIG. 4) movement of which by the bale wagon operator tensions one or other of the ropes 108 which then clutches the associated capstan 107 whereupon the carriage, and hence entire pick-up means 23, is moved in one direction or another, as required, along the guide channels 35 and 36. This movement can only occur when the inclined conveyor 55 has been pivoted to a horizontal position by actuation of the cylinder 88 in line with the horizontal conveyor 56 as seen in FIG. 3 because it is only in this position that the drive belt 106 is tensioned between the pulleys 103 to 104 to impart drive to the shaft 105 and capstans 107. In the operative position of the pick-up means shown in FIG. 2, the pulleys 103 and 104 are positioned closer together so that the belt 106 is slack and the drive to the shaft 105 and capstans 107 interrupted. The carriage is lockable in the operative and inoperative position of the pick-up means 23 by a locking device comprising a pair of stops 112 attached to the carriage and engageable with one or other of two latches 113 carried by a shaft 114 according to whether the pick-up means is in the operative or inoperative position. The shaft 114 is rotatable by a linkage system 115 connected to the control member 111 so that the latches are either in the operative position shown in full lines in FIG. 6 or one of two inoperative positions shown in broken lines.

The horizontal conveyor 56 forms part of a transfer table extending the width of the first load floor 17 and further comprising a floor portion 116 extending from, and hingedly attached to, the frame 32 and slightly overlapping an inclined member 117 of the horizontal conveyor 56. The floor portion 116 extends downwardly towards the horizontal conveyor 56 so that as the latter moves from the operative to the inoperative position of the pick-up means the floor portion is hinged upwardly to allow the carriage to move thereunder to the position of FIG. 3. It will be noted that the dimensions of the horizontal conveyor 56 and the floor portion 116 transversely of the bale wagon are such that a first bale loaded on to the transfer table by the pick-up means 23 sits on the left hand end of the floor portion 116 as seen in broken lines in FIG. 2. As a second bale is picked up and is eventually conveyed by the horizontal conveyor 56, it pushes the first loaded bale further along the floor portion 116 until it contacts a bale presence sensor 118 to initiate a drive step of the conveyors 27 and 28, whereupon the next available bale pusher 31 of the conveyor 27 sweeps down from the second load floor 18 and engages the bales on the transfer table and moves them onto the first load floor 17.

The general operation of the illustrated bale wagon has already been described in brief and will now be elaborated a little. Assuming the bale wagon to be empty, it is towed over a field in which bales of crop material are dispersed and steered towards bales in turn in such a way that each bale enters the pick-up guides 65 and on to the pick-up elevator 52. The first bale is elevated by the elevator 52, passed to the inclined conveyor 55 and thence to the horizontal conveyor 56 which transfers the bale to the adjacent end of the floor portion 116 of the transfer table. In this position, the first bale is out of engagement with the sensor 118 but engages the same on being pushed further onto the floor portion 116 by the next bale which is picked up from the ground. This initiates a drive step for the conveyors 27 and 28 with the result that the first pair of bales is transferred to the first load floor 17.

The subsequent movement of the bales through the bale wagon is described, and details of other components of the wagon given, in co-pending Patent Application Ser. No. 165,153. Also, other aspects of the illustrated embodiment are described and claimed in co-pending Patents Application, Serial No. 165,160.

When the bale wagon is to be transported on public highways, the overall width has to be reduced, assuming the effective width as regards bale capacity is maximized, and this is achieved in the illustrated embodiment by energizing the cylinder 88 to pivot the inclined conveyor 55 to a position in alignment with the horizontal conveyor 56 and then sliding the entire pick-up means 23 transversely of the wagon by operating the control 111 and hence energizing the appropriate capstan clutch 107, 108. The transfer table needs to be clear of bales for this operation. FIG. 3 shows that the pick-up means 23 is stowed within the width of the load floors when in the fully retracted, inoperative or transport position.

FIG. 1 of the drawings shows that the transfer table is located beneath the front end of the second load floor 18 which means that bales have to be delivered to the table in a relatively confined space. This is no problem with the use of the two conveyors 55 and 56 as the latter feeds the bales horizontally whereby the minimum of headroom is required.

Having thus described the invention, what is claimed is:

1. Bale pick-up means for a bale of crop material having at least one face, the combination comprising:
    (a) a mobile frame;
    (b) bale elevator means mounted along a predetermined plane on the frame and operable to lift a bale from the ground on being engaged thereby;
    (c) bale holding means operable constantly to engage a bale being elevated during the lifting process and to hold the bale in contact with the elevator means, the bale holding means further comprising a generally planar member for contact with at least one face of the bale being elevated and being movable between a rest position and raised position generally parallel to the plane of the elevator means in response to a bale engaging the elevator means;
    (d) first rigid link means having a first end and an opposing second end pivotally attached at the first end to the frame and pivotally attached at the second end to the planar member;
    (e) second link means equal in length to the first link means having a first end and an opposing second end pivotally attached at the first end to the frame below the pivotal attachment of the first link means to the frame and pivotally attached at the opposing second end to the planar member, the second link means being selectively operative according to the orientation of the planar member relative to the frame and arranged so that when operative it is parallel to the first link means;
    (f) stop means mounted to the frame between the first link means and the planar member; and
    (g) third link means having a first end and an opposing second end pivotally attached at the first end to the frame and at the second end to the planar member, the third link means being selectively operative according to the orientation of the planar member relative to the frame and arranged so that when operative the line of action of the third link crosses the line of action of the first link means such that when the planar member is in the rest position the second link is inoperative and the third link means is operative with the stop means to hold the planar member generally perpendicular to the plane of the elevator means, so that the first and second link means form a parallelogram that permits the planar member to move parallel to the elevator means to allow any variation in the thickness of the bale to be handled while the third link is inoperative and when the third link becomes operative as the planar member drops when the elevated bale leaves the elevator means the third link ensures that at least a portion of the planar member pivots towards the bale to maintain contact between the bale and the planar member and the bale and the elevator means until the bale is clear of the bale holding means.

2. Bale pick-up means according to claim 1, wherein the second and third link means are each in the form of a chain.

3. Bale pick-up means according to claim 1, wherein the second and third link means are each in the form of a rigid member having a lost motion connection at one of its pivot points.

4. A bale wagon according to claim 3, wherein the planar member has a heel portion inclined to the plane of the planar member.

5. Bale pick-up means according to claim 4, wherein the line of action of the elevator means is generally upright but inclined to the vertical to assist the turning of an elevated bale upon delivery from the elevator means.

6. A bale wagon according to claim 5, wherein the inclination to the vertical of the line of action of the elevator means is 15 degrees.

7. A bale wagon according to claim 6, wherein the line of action of the elevator means is also inclined upwardly and away from a bale to be engaged by the elevator means.

* * * * *